Aug. 5, 1924.
W. SECK
1,504,151
VACUUM TANK FOR MEASURING PETROL CONSUMPTION
Filed May 15, 1922
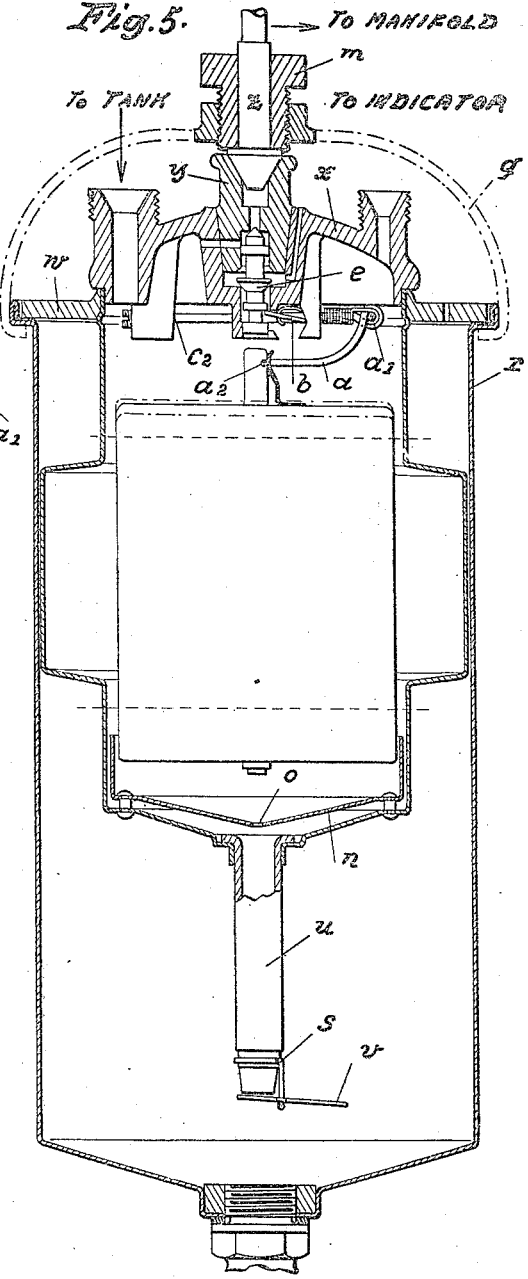
INVENTOR
Willy Seck
by [signature]
Attorney.

Patented Aug. 5, 1924.

1,504,151

UNITED STATES PATENT OFFICE.

WILLY SECK, OF BERLIN-WILMERSDORF, GERMANY.

VACUUM TANK FOR MEASURING PETROL CONSUMPTION.

Application filed May 15, 1922. Serial No. 561,233.

*To all whom it may concern:*

Be it known that I, WILLY SECK, a citizen of Germany, residing at Berlin-Wilmersdorf, Germany, have invented certain new and useful Improvements in Vacuum Tanks for Measuring Petrol Consumption, for which I have filed an application in Germany, March 18, 1921, of which the following is a specification.

My invention relates to liquid fuel delivery systems for motor vehicles of the type in which so-called vacuum tanks are employed provided with two compartments with valve controlled communicating means, and my invention particularly refers to vacuum tanks of the kind provided with a float controlled actuating mechanism for alternately connecting the suction chamber of tanks of the kind referred to with the atmosphere and with a source of suction.

As heretofore constructed vacuum tanks have been connected with a pneumatic counting mechanism adapted for recording the amount of fuel that has been fed by the tank. In order to obtain accurate measurements it is necessary for the tank to be so arranged as to feed always uniform quantities of liquid, which it has been impossible to accomplish with the kinds of apparatus as heretofore in use. Now, as compared with the previous state of the art my invention has for one of its important objects means to insure the accurate dumping of predetermined quantities of the liquid fuel within the tank.

The means provided in the practice of my invention comprise firstly a valve actuating mechanism so arranged and constructed as to exclude all frictional strain on rotating pivots and studs and other important operating parts; secondly, it comprises means to render the float independent upon the vibrations during the operation of the motor vehicle; thirdly, the invention comprises a special configuration and construction of the upper compartment adapted to compensate and prevent objectionable interference with the results of the measurements which are liable to result from unavoidable inexact adjustments of the upper and lower level of the fuel, and fourthly my invention also comprises as an important means for attaining its objects a peculiar construction of check valve of great exactness at the bottom of the upper compartment.

My invention will be more clearly understood from the following description by aid of the drawings showing by way of example an embodiment thereof in—

Figs. 1, 2 and 3 in a conventional manner, all parts not necessary for the understanding of the principle of my invention being left out for the sake of clearness.

Fig. 4 is a detail of Fig. 3 in part elevation, part section.

Fig. 5 is a sectional view of a tank embodying the principle of my invention.

In Figs. 6 to 11 inclusive I have shown parts in detail employed in the embodiment of my invention, and to be referred to hereafter.

The invention, as appears from Figs. 1 to 3, comprises two substantially U-shaped members $a$ and $b$ which are connected to a common base portion $d$ by the intermediary of a tensional spring $f$ operatively connected to said members. The free ends $b_2$ and $b_3$ of both legs of the member $b$ which acts as a tipping lever constitute knife edges supported in the suitably recessed lugs or projections $d_2$ and $d_3$ of the base $d$ and adapted to admit of frictionless rocking or tilting movement of the yoke-shaped member $b$ under the action of spring $f$. The oscillation of the tippng or tilting lever $b$ is limited by the projections $e_1$ and $e_2$ of the stop $e$ mounted on the base portion $d$. The ends of the legs of the yoke shaped wire $a$ are provided with conical points by means of which they are supported in the socket shaped depressions of the ends of the two screws $c_2$ and $c_3$ about which the yoke $a$ is free to be antifrictionally oscillated. The spring $f$ which operates upon the yoke-shaped wire $a$ at the point $a_1$ and upon the yoke $b$ at the point $b_1$ has the tendency of drawing the knife edges and the points tightly upon their supports, and inasmuch as the points of operation of the spring $f$ on the yokes are formed as knife edges $a_1$ and $b_1$ (shown enlarged in Figure 4) the entire system is highly sensitive.

By rocking the wire yoke $a$ on its pivoting axis the yoke $b$ is caused to tilt in the usual manner (Figures 2 and 3), by turning the two screws $c_2$ and $c_3$ the tension of the spring $f$ may be regulated, so as to adjust the required degree of the force necessary for producing the tilting action.

In Figure 5 I have shown a means for utilizing the principle of my invention, as embodied in a vacuum tank. The general construction of this tank is similar to that of the ordinary system of construction of such tanks and comprising an upper compartment and a lower compartment with check valve for controlling communication between these two compartments. The regulation of the admission of air which, in the simplest manner, may be effected, for example by a double seat drop valve; but it is obvious that I am not restricted thereto, and may make use of other valve or communication controlling means. Of the details of construction, shown in Figures 1 to 3, the tilting lever, the tensional spring and the wire yokes, only the yokes have been somewhat modified in a manner more clearly shown in Figures 6 and 7. This modified construction provides for a more convenient operating connection of the float with the wire yoke. The manner of connecting these parts is more clearly shown in Figure 5. With a view of increasing the sensitiveness of the arrangement the point $a_1$, at which the spring for operating the tilting lever $b$ acts upon the wire yoke $a$, is situated at substantially twice the distance of the point of actuation $a_2$ of the float on the wire yoke, so that the path travelled by the float is only half as large as the amplitude of oscillation of the point $a_1$. As compared with valve adjusting mechanism as heretofore constructed, in which the path of travelling of the float is influenced by low speed driving means, so as to become comparatively long, the float according to my invention performs only very short vertical reciprocations. These movements of the float are caused as usual by the induction or eduction of the liquid, and contrary to the resistance produced by the spring $f$ and depending upon the tension thereof. Inasmuch however, as in accordance with this invention the spring tension is much stronger than in the tanks heretofore in use, the float will also be adapted to produce a much greater force for the reversal of parts required in the controlling mechanism. The float should, therefore, be very deeply immersed in the liquid at the end of the suction period in order to obtain the necessary upward pressure, that is to say, that the level of the liquid should rise very much in the upper compartment. On the other hand, upon the discharge of the liquid from the upper to the lower compartment the level of the liquid will be lowered much more than in the ordinary tanks of the kind referred to. Thus it is obvious that, as compared with the variation of approximately 2½ inches of the reciprocation of the liquid level the distance of only one tenth of an inch for the travel of the float is very small. In Figure 5 I have indicated in dotted lines the two terminal positions of the levels, while the respective positions of the float have been indicated by dot-and-dash lines.

Thus for instance during the suction period liquid will be admitted, until the upward pressure upon the float has become sufficiently strong to overcome the spring action, which results in the tilting of the lever $b$ and in the termination of the suction period and the stopping of the admission of liquid. A stop for the tilting lever $b$ is provided by the walls of an annular groove arranged in the stem of the double seat drop valve $e$ (Figure 5) which is vertically reciprocated by the tilting lever. In each of the two terminal positions of the double seat drop valve one of the two cones of the same will be engaged with its seat, as appears from Figure 5 of the drawing. This double seat valve is not a necessary part of my invention, inasmuch as it may be replaced, for instance, by two suitably constructed separate valves or by other controlling means, but for the purpose of this specification the invention has been set forth as embodied in a construction employing this kind of valve as a controlling and regulating means.

Though the suction has the tendency to keep the valve in its terminal positions, the varying force of the same has altogether no influence upon the movement of the lever $b$ inasmuch as the lever, when the tilting is about to occur, is not exposed to the reaction of the valve kept in the closed position thereby, so that the suction operating on said valve is not in position to either retard or accelerate the commencement of the tilting action. Inasmuch, therefore, as the lever $b$ at the moment of its sudden operation is only under the tension of the spring $f$, the tilting will have to occur at always the same vertical position of the float. Only after the tilting lever $b$ has performed part of its oscillation, it will engage the pressure-loaded valve, and it will then exert sufficient force to enable the valve to become lifted from its seat with certainty and independently of the fact whether it is compelled to overcome a high or low suction.

By adjusting the force of the spring $f$ the two limits of alteration of the alternatingly rising and descending level of the liquid may be varied at discretion, so that the amount of liquid fed during a certain period of time may be exactly adjusted to a certain definite ratio. Inasmuch as this adjustment merely requires the turning of the two screws $c_2$ and $c_3$ the apparatus may be easily gauged to indicate a certain predetermined measure.

Figure 5 illustrates the valve adjusting mechanism during the flowing out of the liquid from the upper compartment into the lower one. During this procedure the double actuating valve $e$ is lifted by the tilting lever which is then in its upper inoperative position, the valve causing the under-pressure from the suction chamber to be cut off, while the latter at the same time is made to communicate in the usual manner with the atmosphere by the action of the double valve *e*. The float having been deprived of its upward pressure by the flowing out of the fuel from the upper compartment pulls the wire yoke *a* downwards until at a certain level of the liquid the tilting of the lever *b* and the consequent change of position of the valve *e* occurs. The same procedure, but in the reverse direction takes place during the now occurring suction period.

A point of importance in connection with the valve adjusting mechanism hereinbefore described is the relative position of the oscillating axes of the two levers *a* and *b* and the length of the radii of oscillation at which the spring is operating, inasmuch as by this means the result is accomplished that the spring remains permanently under tension so as to be adapted to force the two yokes permanently upon their supporting seats. This arrangement is conditional for the mounting upon knife edges which cannot be obtained in any of the valve mechanisms now in use on connection with tanks of the kind referred to; and only by means of the knife edge bearings the controlling and regulating means can be constructed with such a high degree of sensitiveness as is required in view of the employment of the tank as a measuring apparatus.

It is evident that by the vibrations incident upon the driving of the car the float is liable to be subjected to jumping movements, which greatly interfere with the exactness of the measurements. In order to obviate these jumping movements of the float it is provided with hydraulic dampening means of a kind to permit the float to follow the changes of level of the liquid, but at the same time preventing sudden axial movements. This object is accomplished by causing the lower end of the float to enter a pan or trough the inner diameter of which is just sufficient to allow of its being moved without impediment so as to allow the float to follow the variations of the level of the liquid without being frictionally interfered with. The mounting of this dampening trough may be effected in different ways, as shown for instance, in Fig. 5 of the drawing. The trough or pan shown in longitudinal section in Fig. 8 is provided with the plurality of feet *p* by means of which it is mounted at a sufficient distance from the bottom of the upper compartment. This distance is so proportioned as to prevent excessive throttling action upon the liquid running out at the bottom of the upper compartment, a condition to which the width of the slot remaining between the trough and the float receptable should also comply.

A small opening *o* serves for the rinsing out of mud particles which happen to be present in the trough. The mode of operation is the same as that of the well known hydraulic dampening means used for a variety of other purposes.

In order to also obviate the influence of the slight irregularities which are still likely to occur in spite of the float dampening action the upper compartment is preferably shaped in a special manner. The diameter of the casing constituting the same as shown in Fig. 5, is greatly reduced at its upper and lower ends so as to leave only a narrow angular slot around the float, while the middle portion of the casing is sufficiently enlarged to allow of its admitting the necessary amount of liquid. The height of this enlarged portion of the upper compartment is so adjusted that the two extreme positions of the level are outside of the said enlargement, as appears from Fig. 5. Inasmuch as small inexactitudes of the two levels will therefore always make their appearance in one of the two narrow portions of the compartment the error in measurement occasioned thereby can never be of such an extent as in the case of an upper compartment of uniform diameter throughout its entire height, as is the case in the tanks heretofore known.

With a view of avoiding interference with the exactness of the measurement in case of deficient operation of the check valve in the bottom of the upper compartment the check valve employed in connection with the vacuum tank according to my invention is constructed in such a manner that its flap is free to move without any friction. This flap *v* the shape of which appears from Figs. 5 and 11 constitutes a straight double armed lever one arm of which possesses a certain overload. By means of the hook *s* (Figs. 9 and 10) which by its own spring action is seated in an angular groove above the lower end of the fuel discharge pipe *u* (Fig. 5) the flap is suspended similar to a scale beam and in such a manner that the lighter weighted lever arm is disposed in front of the pipe opening. It will therefore always have the tendency to bear against the lower edge of the pipe but without effecting a tight closure, since the hook *s* is of such length that the flap is compelled to assume the position shown in Fig. 5 in which it will be in contact with the edge of the pipe at one point only so as to leave a narrow open slot at one side, as appears from Fig. 5. Upon producing a lower pressure in the upper compartment by the operation of the engine the valve flap *v* is raised by the action of the lower pressure and will now effect a tight closure of the end of the pipe. The flap is now freely suspended at the lower pipe end which it will freely engage, inasmuch as it is not interfered with by any other additional means or by friction caused at pivotal studs or otherwise. This valve is exceedingly sensitive and is adapted to follow the slightest variations of pressure.

In order to be able to quickly and readily clean the vacuum tank it is preferably constructed in such a manner that, after the release of a single screw, it may be completely decomposed into its individual sections. As appears from Fig. 5 a staple or yoke $q$ shown in dotted lines engages over the outer projecting edge of the outer vessel $r$ into which the upper compartment is inserted by being suspended with its flange $w$. The upper compartment is closed by a lid $x$ in the middle of which the conical stopper $y$ carrying one of the valve seats is inserted. Into the conical stopper $y$ the connecting cone of the pipe conduit Z leading to the manifold is fitted from above. By means of the screw $m$ mounted in the staple $q$ the parts $z, y, x, w$ and $v$ may be securely connected to each other.

The invention is capable of a variety of other modifications within the scope of the claims so as to become adapted to various requirements and to suit the convenience of the user, and without deviating from the spirit of my invention.

I claim:

1. Liquid delivering device comprising in combination, a tank, a liquid controlling valve connected with said tank, a float in said tank, a pair of cooperative trip levers in engagement with said float and said valve, respectively, a knife edge on one lever resting on part of said tank and means for causing said levers under the influence of said float to change of a sudden their position and the operative position of said valve.

2. Liquid delivering device comprising in combination, a tank, a liquid controlling valve connected with said tank, a float in said tank, a pair of cooperative trip levers in engagement with said float and said valve, respectively, a knife edge on one lever resting on part of said tank and a spring connecting and adapted to cause said levers under the influence of said float to change of a sudden their position and the operative position of said valve.

3. Liquid delivering device comprising in combination, a tank, a liquid controlling valve connected with said tank, a float in said tank, a pair of cooperative trip levers, one being in engagement with said float and the other with said valve, a knife edge on one lever resting against part of said tank and a spring having an end attached to said float-engaging lever and the other end to a point of said valve-engaging lever intermediate the fulcrum and the point of spring attachment of said float-engaging lever.

4. Liquid delivering device comprising in combination, a tank, a liquid controlling valve connected with said tank, a float in said tank, a pair of cooperative trip levers, one being in engagement with said float and the other with said valve, one of said levers being U-shaped and embracing the other lever, a knife edge on one lever resting against part of said tank and a spring having one end attached to said float-engaging lever and the other end to a point of said valve-engaging lever intermediate the fulcrum and the point of spring attachment of said float-engaging lever.

5. Liquid delivering device comprising in combination, a tank, a liquid controlling valve connected with said tank, a float in said tank, a pair of U-shaped cooperative trip levers, one being in engagement with said float and the other with said valve, a knife edge on one lever resting against part of said tank and a spring having one end attached to said float-engaging lever and the other end to a point of said valve-engaging lever intermediate the fulcrum and the point of spring attachment of said float-engaging lever.

6. Liquid delivering device comprising in combination, a tank, a liquid controlling valve connected with said tank, a float in said tank, a pair of U-shaped cooperative trip levers, one being in engagement with said valve, the other with said float and embracing said valve-engaging lever, knife edges on each lever resting against oppositely disposed points of said tank and a spring having one end attached to said float-engaging lever and the other end to a point of said valve-engaging lever intermediate the fulcrum and the point of spring attachment of said float-engaging lever.

7. Liquid delivering device comprising in combination, a tank, a liquid controlling valve connected with said tank, a float in said tank, a pair of U-shaped cooperative trip levers, one being in engagement with said valve, the other with said float and embracing said valve-engaging lever, a knife edge on one and a point on the other lever resting against oppositely disposed parts of said tank, adjusting screws operatively related to the point on one of said levers, and a spring having one end attached to said float-engaging lever and the other end to part of said valve-engaging lever intermediate the fulcrum and the point of spring attachment of said float-engaging lever.

8. Liquid delivering device comprising in combination, a tank having a middle portion of greater diameter than its top and bottom portions and a float having a diameter slightly inferior to the diameter of said top portion.

9. Liquid delivering device comprising in combination, a tank having a middle portion of greater diameter than its top and bottom portions and a float having a diameter slightly inferior to the diameter of said top portion, a pair of cooperative trip levers in engagement with said float and said valve, respectively, a knife edge on each lever resting on part of said tank and means for causing said levers under the influence of said float to change of a sudden their position and the operative position of said valve.

10. Liquid delivering device comprising in combination, a tank, a contracted portion near the bottom of said tank and having a narrow opening and a float vertically movable in said tank and fitting with little play in said contracted portion.

11. Liquid delivering device comprising in combination, a tank, a trough in said tank with a narrow opening in the bottom and a float vertically movable in said tank and fitting with little play in said trough.

12. Liquid delivering device comprising in combination, a tank having a middle portion of greater diameter than its top portion, a contracted portion near the bottom of said tank and having a narrow opening and a float vertically movable in said tank and fitting with little play in said top portion and said contracted portion.

13. Liquid delivering device comprising in combination, a tank having a middle portion of greater diameter than its top portion, a trough in said tank with a narrow opening in the bottom and a float vertically movable in said tank and fitting with little play in said top portion and said trough.

14. Liquid delivering device comprising in combination, a tank, a suction valve connected with said tank, an outlet at the bottom of said tank and a check valve operatively connected with said outlet, but arranged for tightly closing said outlet only under the action of suction.

15. Liquid delivering device comprising in combination, a tank, a suction valve connected with said tank, an outlet at the bottom of said tank and an overbalanced flap valve loosely suspended underneath said outlet and adapted to be forced against said outlet by the action of suction.

16. A liquid delivering device comprising in combination with a fuel receiving chamber, the suction connection thereto, a valve controlling said suction connection and a float for controlling said valve, of means for damping the action of the float, whereby its rise and fall is caused and determined by the depth of liquid independently of jolting action to which said float may be subjected.

In witness whereof I affix my signature.

WILLY SECK.